Feb. 4, 1941. O. NEUMANN 2,230,869
ENCLOSED CIRCUIT INTERRUPTER
Filed Jan. 12, 1939 2 Sheets—Sheet 1
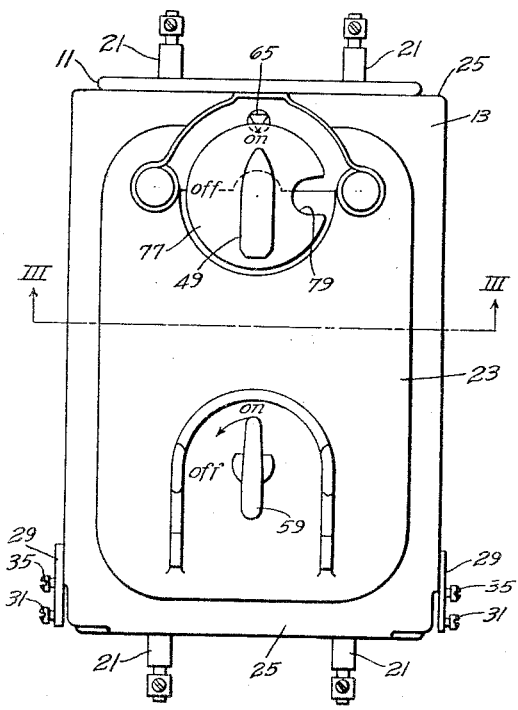
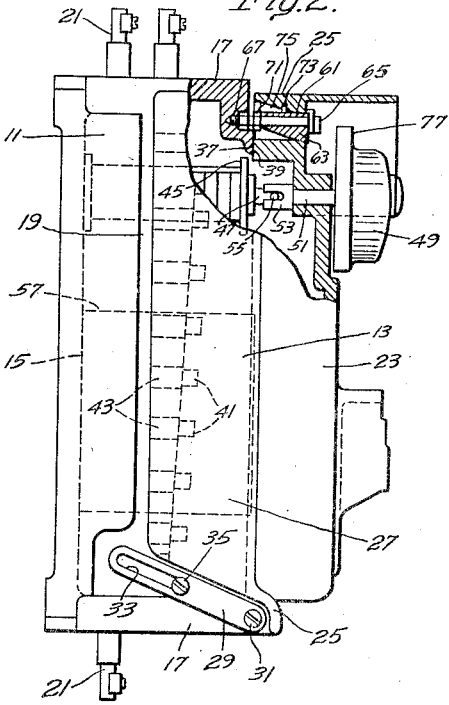
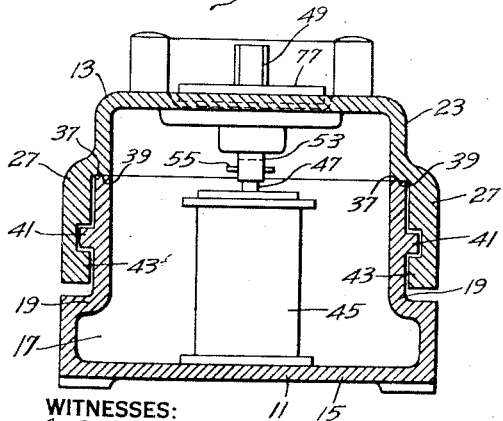
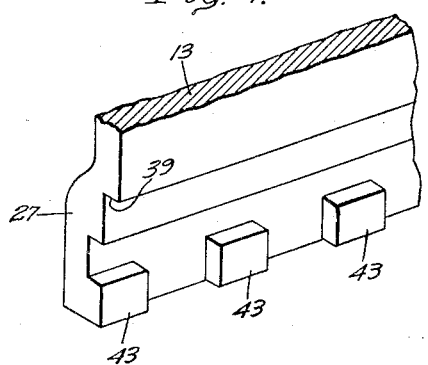
INVENTOR
Otto Neumann.
BY
ATTORNEY
WITNESSES:

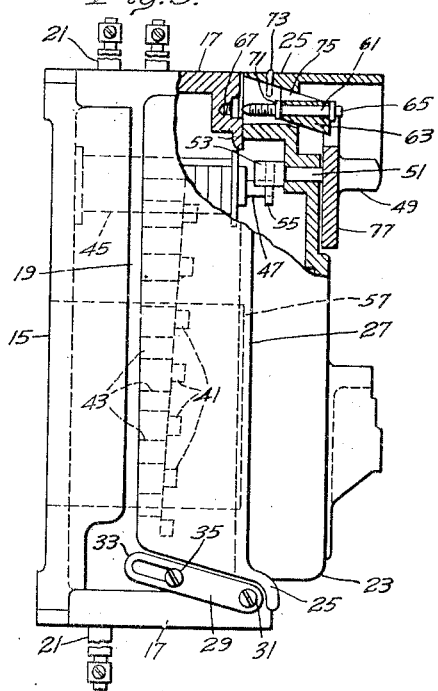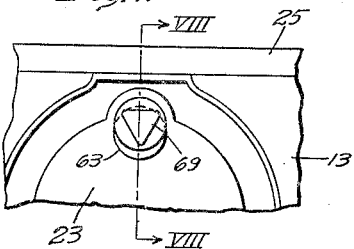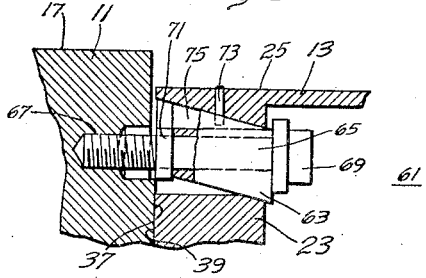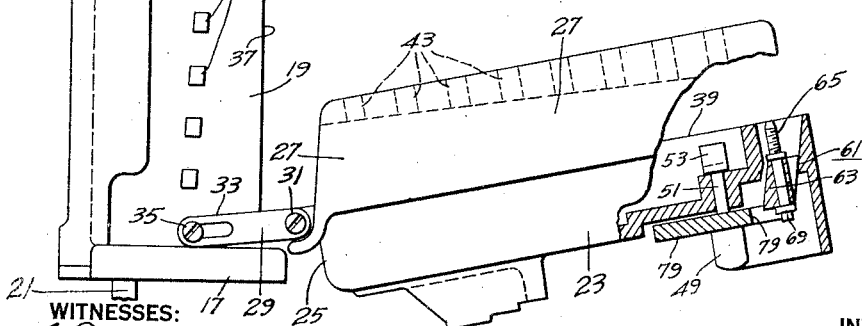

Patented Feb. 4, 1941

2,230,869

UNITED STATES PATENT OFFICE 2,230,869

ENCLOSED CIRCUIT INTERRUPTER

Otto Neumann, Berlin-Siemensstadt, Germany, assignor to Westinghouse Electric & Manufacturing Company, East Pittsburgh, Pa., a corporation of Pennsylvania Application January 12, 1939, Serial No. 250,539
In Germany January 8, 1938

20 Claims. (Cl. 200—50)

The invention relates, in general, to housed electrical apparatus, and more particularly to explosion proof housings for enclosing electrical circuit interrupting devices such as switches, circuit breakers, fuses, relays or the like.

In the usual types of explosion proof housing, the cover is tightly secured to the housing by a large number of bolts or is hinged to a side of the housing and locked tightly by a plurality of screws or similar wedge devices. Such arrangements require considerable time and effort to open the cover or to tightly seal the cover to the housing. The hinged construction also requires a large lateral space for mounting the housing in order to accommodate the hinges and permit lateral opening of the cover.

An object of the invention is the provision of an improved explosion proof housing for electrical apparatus which requires a minimum amount of mounting space, and in which the cover is quickly and easily opened, or closed and sealed.

Another object of the invention is the provision of an improved explosion proof housing in which the cover is released and opened, or closed and sealed by two very simple operations or movements.

Another object of the invention is the provision of an improved explosion proof housing in which the cover is released, or tightly sealed by a sliding movement of the cover on the housing.

Another object of the invention is the provision of an explosion proof housing in which flame proof engagement between the cover and casing is effected by interengaging surfaces on the cover and casing which are inclined relative to the joint between the cover and casing, and in which the cover is released or tightly sealed by sliding the cover a limited amount on the casing.

Another object of the invention is the provision of an explosion proof housing having a cover hinged at one end which is released or tightly clamped to the casing by means of a claw type lock formed on opposite sides of the housing which is operable to release or tightly clamp the cover by limited sliding movement of the cover.

Another object of the invention is the provision of an improved explosion proof housing as previously described with a simple locking element which is operable to slide the cover to effect release or tight sealing of the cover.

Another object of the invention is the provision of an explosion proof housing as described in the preceding paragraph in which the locking element is arranged so that it cannot be operated to effect release of the cover until the circuit interrupter in the housing has been operated to open the circuit.

Another object of the invention is the provision of an explosion proof housing for a circuit interrupter as previously described in which the circuit interrupter cannot be operated to close the circuit until the cover has been tightly clamped to the casing.

The novel features that are considered characteristic of the invention are set forth in particular in the appended claims. The invention itself, however, both as to structure and operation, together with additional objects and advantages thereof, will be best understood from the following detailed description of one embodiment thereof, when read in conjunction with the accompanying drawings, in which Figure 1 is an elevational view of an explosion proof circuit interrupter housing constructed in accordance with the invention;

Fig. 2 is a side elevational view, partly in section, of the housing shown in Fig. 1;

Fig. 3 is a vertical sectional view of the housing taken substantially along the line III—III of Fig. 1 and looking in the direction of the arrows;

Fig. 4 is a fragmentary perspective view of one of the side walls of the cover of the housing;

Fig. 5 is a side elevational view, partly in section, of the housing showing the cover moved upwardly in its released position ready to open, and the circuit interrupter in the "off" position;

Fig. 6 is a side elevational view, partly in section, of the housing with the cover in the open position;

Fig. 7 is a fragmentary view showing the head of the locking element; and

Fig. 8 is a fragmentary sectional view of the locking means, taken substantially along the line VIII—VIII of Fig. 7.

Referring to the drawings, the explosion-proof housing comprises a cast rectangular box-like metal casing 11 and a cast metal cover 13. The casing 11 has a back wall 15, end walls 17, and inwardly offset side walls 19, and the casing is provided with a plurality of insulated terminal connections 21 at each end which extend through the end walls of the casing and serve to electrically connect the electrical apparatus mounted in the housing to an external electrical circuit. The cover 13 has a dome 23, end walls 25 adapted to abut the end walls 17 of the casing 11, and side walls 27 which overlap the inwardly offset side walls 19 of the casing.

The cover 13 is mounted on the casing 11 at one end for swinging movement to open and to closed position and also for limited sliding movement by a pair of hinges 29 disposed on opposite sides of the housing. The hinges 29 are pivotally mounted at their one ends on a pair of screws 31 engaged on opposite sides of the cover 13, and the opposite ends of the hinges are provided with slots 33 which engage a pair of screws 35 secured to the opposite sides of the casing 11. The slots 33 in the hinges permit limited straight-line sliding movement of the cover 13 on the casing 11 when the cover is closed.

The walls of the casing 11 and the cover 13 are provided with abutting surfaces 37 and 39. These surfaces 37 on the casing 11 comprise the upper edge surfaces of the end walls 17 and side walls 19. On the cover 13, the cooperating surfaces 39 comprise the edge surfaces of the end walls 25, and the shoulder surfaces formed on the inside of the two side walls 27 (Fig. 3). The abutting surfaces 37 and 39 are machined to a high degree of smoothness so that substantially all points thereof lie in the same plane for the purpose of providing a flame-proof joint between the casing 11 and the cover 13 when the abutting surfaces are held in tight engagement.

A means is provided which is operable by limited downward sliding movement of the cover 13 on the casing 11 after the cover is closed to effect tight engagement of the abutting surfaces 37 and 39, and to lock or hold the cover 13 in its final closed position, and which is operable by limited upward sliding movement of the cover 13 on the casing 11 to release the tight engagement of the abutting surfaces and to also release the cover 13 for opening. This means comprises a plurality of spaced and aligned locking elements 41 which project outwardly from each of the inwardly offset side walls 19 of the casing 11, and a plurality of cooperating spaced and aligned locking elements 43, which project inwardly from the side walls 27 of the cover 13 adjacent the lower edges of the side walls.

The locking elements 41 and 43 are arranged to pass by or between each other when the cover 13 is in its upwardly displaced position to permit swinging of the cover 13 to open or to closed position. When the cover 13 is closed and displaced downwardly on the casing 11 by sliding movement thereon, the locking elements 43 on the cover 13 are moved into engagement under the locking elements 41 on the casing 11, and in the final closed position shown in Fig. 2, the locking elements 41 and 43 are engaged one over the other and thus prevent opening of the cover. The engaging surfaces of the locking elements 41 and 43 are disposed in a plane inclined at a slight angle to the plane of the abutting surfaces 37 and 39 so that the movement of the locking elements into engagement by the downward sliding movement of the cover causes the locking elements to wedge the abutting surfaces 37 and 39 of the cover and casing into tight flame-proof engagement. Conversely, upward sliding movement of the cover 13 on the casing causes the locking elements 41 and 43 to disengage and effect release of the tight engagement of the abutting surfaces 37 and 39. Thus the air gap between the abutting surfaces 37 and 39 is adjusted by the sliding movement of the cover 13 on the casing 11.

If desired, the engaging surfaces of the locking elements 41 and 43 may be arranged to lie in a plane parallel to the back wall 15 of the casing 11, and the abutting surfaces 37 and 39 disposed in a plane which is at a slight angle to the plane of the back wall 15 of the casing. This reverse arrangement of the surfaces will produce the same effect as described above in connection with the construction shown in the drawings.

The explosion-proof housing may be used to enclose any electrical apparatus such, for example, as switches, circuit breakers, relays or any other type of circuit interrupting device. In the embodiment of the invention shown, a rotatably operated circuit interrupter 45 of conventional type is mounted in the housing on the back wall 15 thereof. The circuit interrupter 45 has an operating shaft 47 which is rotatable to "on" and "off" positions to actuate the interrupter to closed and open circuit positions. An operating handle 49 is rotatably mounted on the cover 13 and this handle has a shaft 51 extending through the cover, and a slotted actuator 53 secured to the end of the shaft inside of the cover which is adapted to operatively engage a cross bar 55 secured to the upper end of the operating shaft 47 when the cover is in closed position. The operating handle 49 is rotatable to "on" and "off" positions for actuating the circuit interrupter to close or open the circuit controlled thereby.

An additional circuit interrupting device or switch 57 (Fig. 2) is mounted in the housing and is operated by an operating handle 59 on the cover 13. The operating handle 59 operatively engages the operating member of the device 57 by means of a bar and slot arrangement similar to the connection between the circuit interrupter 45 and its operating handle 49, previously described. In this connection, it is to be noted that the connections between the operating handles 49 and 59 and the devices 45 and 57 are such that the cover 13 cannot be displaced upwardly to its released position until both operating handles have been moved to the "off" position. This results from the fact that when either of the operating handles are in the "on" position, its cross bar and slot connection is disposed at right angles to the direction of sliding movement of the cover 13 so as to effectively prevent such sliding movement of the cover.

A means, indicated generally at 61, is provided which is manually operable in one direction to cause downward sliding movement of the cover 13 on the casing 11 to its final closed position and to lock the cover in this position, and which is operable manually in the opposite direction to cause upward sliding movement of the cover to its released position and to also release the cover for opening.

This means, shown enlarged in Fig. 8, comprises a wedging or guiding member 63 of cylindrical shape engaged in a recess provided therefor in the upper end of the cover 13, and a locking screw 65 which extends through an eccentric opening in the guiding members 63 and is engageable in a threaded opening 67 formed in the upper end wall 17 of the casing 11. The locking screw 65 is mounted eccentrically in the cylindrical guiding member 63 so that the axis of the guiding member 63 extends at an angle to the axis of the locking screw 65. The locking screw 65 is rotatably mounted in the guiding member 63, and the guiding member 63 is connected to the locking screw for rectilinear movement therewith by the head 69 of the screw which engages the outer end of the member 63, and by a collar 71 secured to the screw which engages the inner end of the member 63. Rotation of the guiding member 63 is prevented by a pin 73 secured to the cover 13 which engages a longitudinal slot 75 provided in the guiding member 63. It will thus be seen that the guiding member 63 is movable rectilinearly with the screw 65 by inward or outward movement of the screw, but at an angle to the axis of linear movement of the screw. The opening in which the guiding member 63 is movably mounted is cylindrical in shape and of substantially the same diameter as the guiding member 63 so that the guiding member fits closely in the opening. Since the axis of the opening and guiding members coincide, the walls of the opening are inclined with respect to the axis of the locking screw 65.

When the locking screw 65 is turned in a clockwise direction, and thus moved inwardly in the threaded opening 67, the guiding member 63 moves inwardly with the screw but at an angle thereto and exerts a wedging or camming effect on the cover 13, causing the cover to be displaced or slid downwardly on the casing 11. Conversely, when the locking screw 65 is turned in a counterclockwise direction and thus moved outwardly in the threaded opening, the guiding member 63 moves outwardly with the screw and exerts a wedging effect on the cover 13 to cause upward sliding movement of the cover on the casing 11. To release and open the cover 13, the locking screw 65 is turned in a counterclockwise direction and thus moved outwardly until it is moved out of the threaded opening 67. This outward movement of the locking screw 65 causes the guiding member 63 to be moved outwardly with the screw and during this movement the guiding member 63 exerts a wedging effect on the cover 13 to cause upward sliding movement of the cover to the released position shown in Fig. 5. In this released position the locking elements 43 on the cover 13 are disengaged from the locking elements 41 on the casing 11 and are disposed in a position to pass by or between the locking elements 41 when the cover is swung to open position. The cover may now be opened by swinging the same to the open position as shown in Fig. 6. To lock the cover after it has been returned to closed position, the locking screw 65 is turned in a clockwise direction, and thus moved inwardly in the threaded opening 67, the locking member 63 is moved inwardly with the screw but at an angle to the rectilinear movement of the screw. This movement of the locking member 63 causes it to exert a wedging effect on the cover 13, sliding the cover downwardly to its final closed position. The downward sliding movement of the cover causes the locking elements 43 to engage under the locking elements 41 on the casing 11 to effect tight engagement of the abutting surfaces 37 and 39.

If desired, the guiding member 63 and the opening provided therefor in the cover may have a polygonal shape so that the member 63 is self guided for rectilinear movement. With this construction the guide slot 75 and guide pin 73 may be omitted.

The locking screw is preferably interlocked with the operating handle 49 which controls the circuit breaker 45. For this purpose, the operating handle 49 is provided with a circular rim 77 which extends over the head of the locking screw 65 to prevent access to the screw 65. The rim 77 is provided with an opening 79 which is moved into alignment with the head of the locking screw 65 when the operating handle 49 is moved to the "off" position. Thus the rim 77 of the operating handle 49 prevents access from being had to the locking screw 65 in all positions of the operating handle except when the operating handle is moved to the "off" position. This interlocking arrangement also prevents the operating handle 49 from being moved to the "on" position until after the locking screw 65 has been moved inwardly a sufficient amount to effect tight engagement of the abutting surfaces 37 and 39 and locking of the cover 13. This results from the fact that when the locking screw 65 is in its outward or released position, it is disposed in the opening 79 formed in the rim of the operating handle 49 and in this position prevents movement of the operating handle towards the "on" position.

To prevent unauthorized opening of the cover, the locking screw 65 is provided with a special shaped head 69. In the embodiment illustrated, the head 69 has a triangular shape, thus only an authorized person having a special tool to fit the head of the locking screw is able to release and open the cover.

While the invention has been disclosed in accordance with the provisions of the patent statutes, it is to be understood that various changes in the structural details thereof may be made without departing from the spirit of the invention. It is desired, therefore, that the appended claims be given the broadest reasonable construction that is permissible in view of the prior art.

I claim as my invention:

1. In an enclosed electrical device, a housing for the device comprising a casing and a cover having one or more abutting surfaces which when closely engaged provide a tight joint between the casing and cover, at least one of said abutting surfaces being disposed in a single plane, and means to effect close engagement of said abutting surfaces comprising interengageable locking surfaces disposed on both said cover and casing operable by sliding movement of said cover on said casing, said locking surfaces all being disposed in a single plane oblique to one or more of the planes of said abutting surfaces.

2. In an enclosed electrical device, a housing for the device comprising a casing and an openable cover having one or more abutting surfaces which when closely engaged provide a tight joint between the casing and cover, at least one of said abutting surfaces being disposed in a single plane, and means comprising a plurality of interengageable elements on both said cover and casing operable by sliding movement of said cover on said casing to effect close engagement of said abutting surfaces, said elements having interengageable locking surfaces which are all disposed in a single plane oblique to one or more of the planes of said abutting surfaces.

3. A housing for electrical apparatus comprising a casing and an openable cover having one or more abutting surfaces which when closely engaged provide a tight joint between said casing and cover, at least one of said abutting surfaces being disposed in a single plane, and means comprising a plurality of spaced interengageable claws formed on the sides of said casing and cover operable by sliding movement of said cover on said casing in one direction to lock said cover on said casing and effect close engagement of said abutting surfaces, and operable by sliding movement of said cover in the opposite direction on said casing to release said cover for opening, the engaging surfaces of all said claws being disposed in a single plane oblique to one or more of the planes of said abutting surfaces.

4. A housing for a circuit interrupter comprising a casing and an openable cover having one or more abutting surfaces which when closely engaged provide a flame-proof joint between said casing and cover, at least one of said surfaces being disposed in a single plane, and means operable by limited sliding movement of said cover in one direction on said casing to lock said cover on said casing and effect close engagement of said abutting surfaces, and operable by limited sliding movement of said cover in the opposite direction on said casing to release said cover for opening, said means comprising a plurality of spaced locking elements projecting from the sides of said casing, and a plurality of spaced cooperating locking elements on said cover, said locking elements passing by each other when said cover is closed and being movable into engagement one over the other by sliding movement of said cover in said one direction, the engaging surfaces of said locking elements being disposed in a single plane oblique to one or more of the planes of said abutting surfaces.

5. In an enclosed electrical device, a substantially rectangular housing for the device comprising a rectangular casing and cover provided with side and end walls and having one or more abutting surfaces which when closely engaged provide a tight joint between the casing and cover, at least one of said abutting surfaces being disposed in a single plane, and means operable by limited rectilinear sliding movement of said cover on said casing in one direction to effect close engagement of said abutting surfaces, and operable by limited rectilinear sliding movement of said cover in the opposite direction on said casing to release the close engagement of said abutting surfaces and permit opening of said cover, said means comprising interengageable locking surfaces on both said casing and cover, said locking surfaces all being disposed in a single plane oblique to one or more of the planes of said abutting surfaces.

6. A substantially rectangular housing for electrical apparatus comprising a rectangular casing and cover having side and end walls and having one or more abutting surfaces which when tightly engaged provide a flame proof joint between said casing and cover, at least one of said abutting surfaces being disposed in a single plane, and means operable by limited rectilinear sliding movement of said cover on said casing in the direction of one of the axes of said housing for effecting tight engagement of said abutting surfaces, and operable by limited rectilinear sliding movement of said cover in the opposite direction on said casing to release the tight engagement of said abutting surfaces, said means comprising interengageable locking surfaces formed on both said casing and cover, said locking surfaces all being disposed in a single plane oblique to one or more of the planes of said abutting surfaces.

7. A substantially rectangular housing for electrical apparatus comprising a substantially rectangular casing and cover having side and end walls and having one or more abutting surfaces which when closely engaged provide a tight joint between said casing and cover, at least one of said abutting surfaces being disposed in a single plane, and means comprising a plurality of interengageable elements on said cover and casing at opposite sides of said housing operable by rectilinear sliding movement of said cover on said casing in one direction to effect close engagement of said abutting surfaces, and operable by rectilinear sliding movement of said cover on said casing in the opposite direction to effect release of said cover, said elements having interengageable locking surfaces which are all disposed in a single plane oblique to one or more of the planes of said abutting surfaces.

8. A substantially rectangular housing for a circuit interrupter comprising a substantially rectangular casing and cover having side and end walls and having abutting surfaces which when tightly engaged provide a flame proof joint between said casing and cover, and means operable by limited rectilinear sliding movement of said cover on said casing in one direction to lock said cover on said casing and effect tight engagement of said surfaces, and operable by limited rectilinear sliding movement of said cover in the opposite direction to release said cover to permit opening of the same.

9. A substantially rectangular housing for a circuit interrupter comprising a substantially rectangular casing and cover having side and end walls and having abutting surfaces which when tightly engaged provide a flame proof joint between said casing and cover, and means comprising interengageable surfaces on said cover and casing operable into engagement by rectilinear sliding movement of said cover in one direction on said casing to effect tight engagement of said abutting surfaces, and operable by rectilinear sliding movement of said cover in the opposite direction on said casing to release said cover for opening.

10. A substantially rectangular housing for a circuit interrupter comprising a substantially rectangular casing and cover having side and end walls and having abutting surfaces on the side and end walls which when tightly engaged provide a flame proof joint between said casing and cover, and means comprising a plurality of interengageable locking elements on opposite sides of said casing and cover which pass by each other on closing of said cover and which are engaged over each other by rectilinear sliding movement of said cover in one direction on said casing to effect tight engagement of said abutting surfaces.

11. A substantially rectangular housing for electrical apparatus comprising a substantially rectangular casing and cover having side and end walls and having abutting surfaces which when closely engaged provide a tight joint between said casing and cover, and means operable by limited rectilinear sliding movement of said cover in one direction on said casing to lock said cover on said casing and effect close engagement of said abutting surfaces, and operable by limited rectilinear sliding movement of said cover in the opposite direction on said casing to release said cover for opening, said means comprising a plurality of spaced locking elements projecting from opposite sides of said casing, and a plurality of spaced cooperating locking elements on said cover, said locking elements passing by each other when said cover is closed and being movable into engagement one over the other by rectilinear sliding movement of said cover in said one direction, the engaging surfaces of said locking elements and the abutting surfaces of said casing and cover being inclined with respect to each other.

12. A substantially rectangular housing for electrical apparatus comprising a substantially rectangular casing and cover having side and end walls and having abutting surfaces on the side and end walls which when closely engaged provide a tight joint between said casing and cover, means mounting said cover on said casing for swinging movement to open and to closed position and also for limited rectilinear sliding movement on said casing when in closed position, and means operable by limited sliding movement of said cover in one direction on said casing to lock said cover on said casing and to effect close engagement of said abutting surfaces, and operable by limited sliding movement of said cover in the opposite direction on said casing to release said cover for opening.

13. In an enclosed electrical device, a substantially rectangular housing for the device having a substantially rectangular cover and casing and means operable by limited rectilinear sliding movement of said cover in one direction on said housing to hold said cover in tight engagement on said housing, and operable by limited rectilinear sliding movement of said cover in the opposite direction on said housing to release said cover for opening, means including a locking member on said cover movable relative to said cover, said means being operable by movement of said locking member in one direction relative to said cover to cause sliding movement of said cover into tight and holding engagement on said housing, and operable by movement of said locking member in the opposite direction relative to said cover to cause sliding movement of said cover to release the cover.

14. In an enclosed circuit interrupter, a substantially rectangular housing for the interrupter having a substantially rectangular cover and casing and means operable by limited rectilinear sliding movement of said cover in one direction on said housing to make the joint between said cover and housing flame proof and to hold said cover against opening, and operable by limited rectilinear sliding movement of said cover in the opposite direction to release said cover for opening, means including a movable locking member on said cover movable relative to said cover, said last mentioned means being operable by movement of said locking member in one direction when said cover is closed to cause sliding movement of said cover to flame proof holding position and to lock said cover in said position, and operable by movement of said locking member in the opposite direction to cause opposite sliding movement of said cover to release the cover for opening.

15. In an enclosed circuit interrupter, an explosive-proof housing for the interrupter having an openable cover and means operable by limited sliding movement of said cover in one direction on said housing to hold said cover in flame tight engagement on said housing, and operable by limited sliding movement of said cover in the opposite direction on said housing to release said cover for opening, an operating handle on said cover movable to "on" and "off" positions for actuating the interrupter, means including a locking member on said cover operable by movement of said locking member in one direction to cause sliding movement of said cover into flame tight and holding engagement on said housing, and operable by movement of said locking member in the opposite direction to cause opposite sliding movement of said cover to release said cover, and means interlocking said locking member and said operating handle to prevent movement of said locking member to release said cover except when said operating handle is in its "off" position.

16. In an enclosed circuit interrupter, an explosion-proof housing for the interrupter having an openable cover and means operable by limited sliding movement of said cover in one direction on said housing to hold said cover in flame proof engagement on said housing, and operable by limited sliding movement of said cover in the opposite direction on said housing to release said cover for opening, an operating handle on said cover movable to "on" and "off" positions for actuating the interrupter, means including a locking member on said cover operable by movement of said locking member in one direction to cause sliding movement of said cover into flame proof and holding engagement on said housing, and operable by movement of said locking member in the opposite direction to cause opposite sliding movement of said cover to release said cover, and means interlocking said locking member and said operating handle to prevent movement of said locking member to release said cover except when said operating handle is in the "off" position and to prevent movement of said operating handle to the "on" position until said locking member has been moved to lock said cover in flame proof engagement on said housing.

17. In an enclosed circuit interrupter, a substantially rectantgular housing for the interrupter having an openable cover and means operable by limited rectilinear sliding movement of said cover in one direction on said housing to hold said cover in tight engagement on said housing and operable by rectilinear movement of said cover in the opposite direction on said housing to release said cover for opening, wedging means on said cover movable relative to said cover and operable by movement in one direction relative to said cover when said cover is closed to cause sliding movement of said cover into tight holding engagement on said housing, and operable by movement in the opposite direction relative to said cover to cause sliding movement of said cover to release said cover.

18. In an enclosed circuit interrupter, a housing for the interrupter having an openable cover and means operable by limited sliding movement of said cover in one direction on said housing to hold said cover in tight flame proof engagement on said housing, and operable by movement of said cover in the opposite direction on said housing to release said cover for opening, means comprising a locking screw on said cover engageable with said housing and an element engaged by said screw and operable by movement of said screw in one direction when said cover is closed to cause sliding movement of said cover into flame proof holding engagement on said housing, and operable by movement of said screw in the opposite direction to cause sliding movement of said cover to release said cover, said element being movable by movement of said locking screw and guided for rectilinear movement on said cover at an angle to the movement of said locking screw.

19. In an enclosed circuit interrupter, a housing for the interrupter having an openable cover and means operable by limited sliding movement of said cover in one direction on said housing to hold said cover in tight flame proof engagement on said housing and operable by movement of said cover in the opposite direction on said housing to release said cover for opening, means comprising a locking screw on said cover engageable with said housing and an element engaged by said screw and operable by movement of said screw in one direction when said cover is closed to cause sliding movement of said cover into flame proof holding engagement on said housing, and operable by movement of said screw in the opposite direction to cause sliding movement of said cover to release said cover, said locking screw having a specially shaped head for actuation by a special tool.

20. A substantially rectangular housing for a circuit interrupter comprising a casing having side walls, and an openable cover for said casing having side walls which overlap the side walls of said casing when said cover is closed, said casing and cover having abutting surfaces on their side walls enclosed by the side walls of said cover when the cover is closed, at least one of said abutting surfaces being disposed in a single plane, said abutting surfaces when tightly engaged providing a flame proof joint between said casing and cover, and means operable by limited rectilinear sliding movement of said cover on said casing to cause said abutting surfaces to make tight engagement, said means comprising interengageable locking surfaces on both said cover and casing, said locking surfaces all being disposed in a single plane oblique to one or more of the planes of said abutting surfaces.

OTTO NEUMANN.